United States Patent
Zampiello et al.

(10) Patent No.: US 9,628,611 B2
(45) Date of Patent: Apr. 18, 2017

(54) CALL ALERT OPTIONS

(71) Applicant: AT&T INTELLECTUAL PROPERTY I, L.P., Atlanta, GA (US)

(72) Inventors: Geoffrey R. Zampiello, Norwalk, CT (US); Steven Charles Salimando, Little Silver, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/799,722

(22) Filed: Jul. 15, 2015

(65) Prior Publication Data

US 2017/0019527 A1   Jan. 19, 2017

(51) Int. Cl.
  *H04M 1/00*   (2006.01)
  *H04M 3/02*   (2006.01)
  *H04M 19/04*   (2006.01)
  *H04M 11/04*   (2006.01)

(52) U.S. Cl.
  CPC ........... *H04M 3/02* (2013.01); *H04M 19/041* (2013.01)

(58) Field of Classification Search
  CPC ............................ H04M 19/04; H04M 19/041
  USPC ........... 455/567; 379/207.16, 373.02, 373.03
  See application file for complete search history.

(56) References Cited

U.S. PATENT DOCUMENTS

| | | |
|---|---|---|
| 7,088,816 B2 | 8/2006 | Donnelly |
| 7,421,067 B2 | 9/2008 | Dewing et al. |
| 7,450,709 B2 | 11/2008 | Gonzalez et al. |
| 7,602,901 B1 | 10/2009 | Kates et al. |
| 7,729,487 B2 | 6/2010 | Koch |
| 7,792,264 B2 | 9/2010 | Pfleging et al. |
| 7,864,947 B2 | 1/2011 | Weiss et al. |
| 7,904,067 B1 | 3/2011 | Tiwari et al. |
| 8,041,401 B2 | 10/2011 | Goldfarb |
| 8,068,593 B2 | 11/2011 | Batni et al. |
| 8,139,745 B2 | 3/2012 | Alston et al. |

(Continued)

FOREIGN PATENT DOCUMENTS

| | | |
|---|---|---|
| EP | 1278361 A1 | 1/2003 |
| WO | 2009036602 A1 | 3/2009 |
| WO | 2013003878 A1 | 1/2013 |

OTHER PUBLICATIONS

"Emotive announces 'Push Ringer'", MobileTech News, mobiletechnews.com, Apr. 19, 2007 Retrieved from http://www.mobiletechnews.com/info/2007/04/19/100912.html, 4 pages.

(Continued)

*Primary Examiner* — Lee Nguyen
(74) *Attorney, Agent, or Firm* — Toler Law Group, PC

(57) ABSTRACT

A device including a processor and a memory that includes instructions that, when executed by the processor, cause the processor to perform operations. The operations include displaying a plurality of call alert options at a user interface. The operations also include receiving, via the user interface, a selection of a first call alert option of the plurality of call alert options and sending information associated with the first call alert option to a server. The operations further include receiving a call request from a second device, where the call request includes data related to the first call alert option. The operations further include, responsive to receiving the call request, generating a call alert based on the first call alert option.

20 Claims, 7 Drawing Sheets

(56) References Cited

U.S. PATENT DOCUMENTS

| | | |
|---|---|---|
| 8,271,683 B2 | 9/2012 | Munson et al. |
| 8,325,887 B2 | 12/2012 | Noldus et al. |
| 8,406,407 B2 | 3/2013 | Opaluch et al. |
| 8,472,591 B2 | 6/2013 | Reynolds et al. |
| 8,548,418 B1 | 10/2013 | Jintaseranee et al. |
| 8,571,607 B1 | 10/2013 | Zarrow et al. |
| 8,644,886 B1 | 2/2014 | Delaney et al. |
| 8,787,952 B2 | 7/2014 | Setton |
| 2005/0143103 A1 | 6/2005 | Bjorgan et al. |
| 2006/0199570 A1 | 9/2006 | Vendrow |
| 2007/0064921 A1 | 3/2007 | Albukerk et al. |
| 2007/0211872 A1 | 9/2007 | Cai et al. |
| 2009/0109957 A1 | 4/2009 | Caradec et al. |
| 2010/0087182 A1 | 4/2010 | Stewart et al. |
| 2010/0233997 A1 | 9/2010 | Hou |
| 2013/0122876 A1* | 5/2013 | Sutcliffe ................ H04M 1/57 455/414.3 |
| 2013/0303151 A1 | 11/2013 | Johnson |

OTHER PUBLICATIONS

"Advanced Ringtone Format Creates Dynamic Conversations Between Callers—Before the Phone Gets Answered—Flipping the Script on Personalization and Storefronts", PRNewswire, prnewswire.com, Retrieved from http://www.prnewswire.com/news-releases/advanced-ringtone-format-creates-dynamic-conversations-between-callers---before-the-phone-gets-answered---flipping-the-scripton-personalization-and-storefronts-58587382.html, Retrieved on Apr. 21, 2015, 3 pages.

* cited by examiner

CALL ALERT OPTIONS

FIELD OF THE DISCLOSURE

The present disclosure is generally related to call alert options.

BACKGROUND

When a calling party calls a called party, an electronic device associated with the called party may generate a call alert, such as playing an audio ringtone and displaying caller identification information associated with the calling party. The audio ringtone is generally set by the called party at the electronic device in advance of the call (e.g., as a phone setting).

DETAILED DESCRIPTION

The present disclosure describes systems and methods to support calling party selected call alerts. A called party may receive a call at a first device (e.g., a called electronic device). As a selected example, the call may include voice, voice over Internet Protocol (VoIP), short message service (SMS) text messages, multimedia message service (MMS) messages, an incoming communication or session initiated protocol request, or any combination thereof, that generates a call alert to the called party. A calling party can select, via a second device (e.g., a calling electronic device), a content item to be used as part of a call alert presented at the first device. In one embodiment, the content item includes an audio ringtone that is played at the first device during the call alert to the called party. In another embodiment, the content item includes a video clip that is played at the first device during the call alert to the called party. Thus, calls (and call alerts) can become more personalized by allowing the calling party to select media presented to the called party to alert a called party of the call.

In a particular embodiment, a device includes a processor and a memory that includes instructions that, when executed by the processor, cause the processor to perform operations. The operations include displaying a plurality of call alert options at a user interface. The operations also include receiving, via the user interface, a selection of a first call alert option of the plurality of call alert options and sending information associated with the first call alert option to a server. The operations further include receiving a call request from a second device. The call request includes data related to the first call alert option. The operations further include, responsive to receiving the call request, generating a call alert based on the first call alert option.

In another particular embodiment, a method includes displaying, at a first device, a plurality of call alert options at a user interface. The method also includes receiving, via the user interface, a selection of a first call alert option of the plurality of call alert options and sending information associated with the first call alert option to a server. The method further includes receiving, at the first device, a call request from a second device. The call request includes data related to the first call alert option. The method further includes generating a call alert at the first device based on the first call alert option.

In another particular embodiment, a method includes receiving, at a second device, a set of call alert options associated with a first device. The method also includes receiving, via a user interface, first input selecting a call alert option of the set of call alert options. The method further includes sending a call request from the second device to the first device. The call request includes data related to the call alert option.

Figure 1:
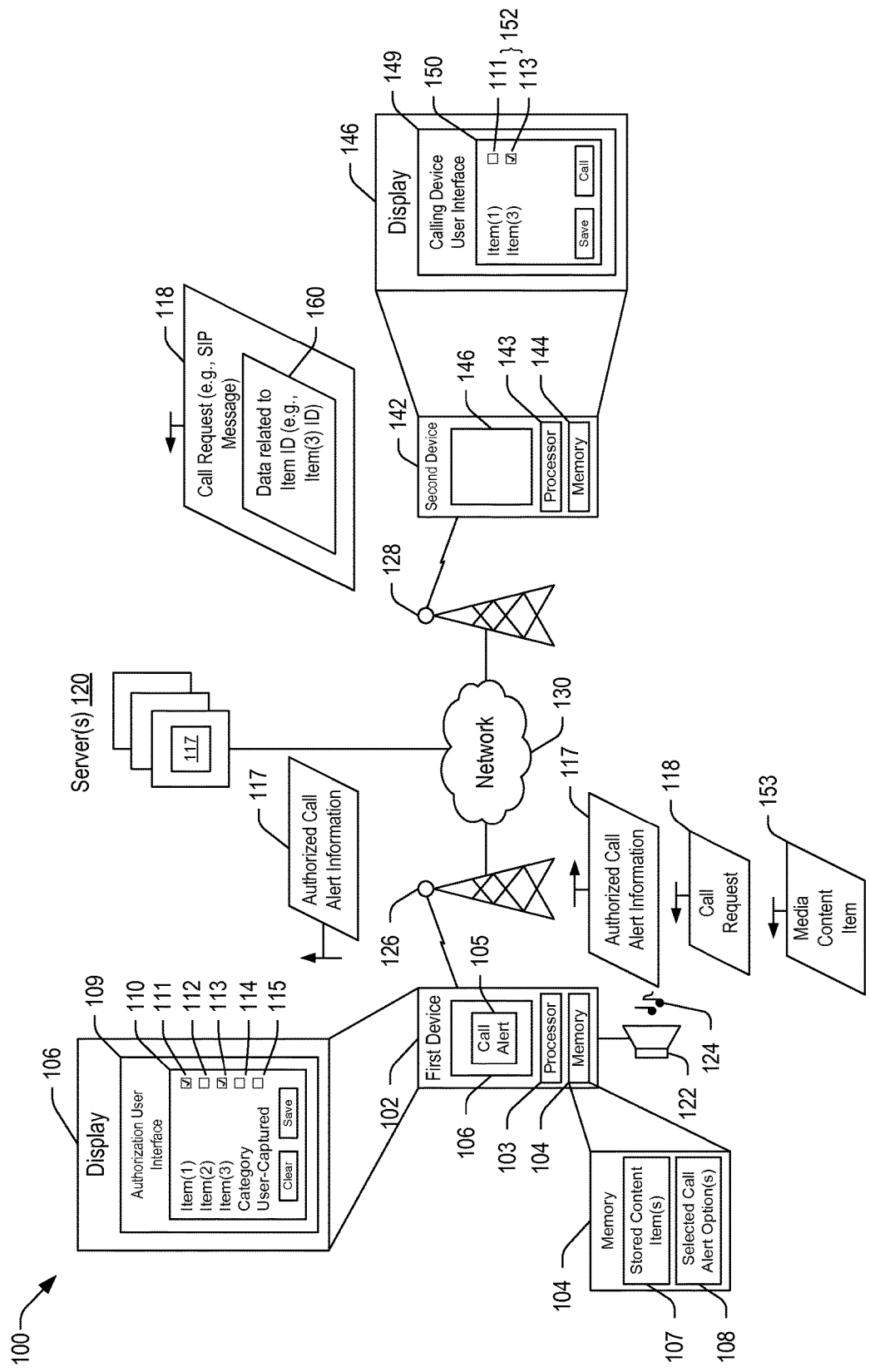
FIG. 1 is a block diagram illustrating a particular example of a system that supports calling party selected call alerts.

Referring to FIG. 1, a particular illustrative embodiment of a communication system 100 is shown. The system 100 includes a first device 102, a network 130, and a second device 142. The first device 102 is coupled to the network 130 via intermediate communication equipment, such as an illustrated communication tower 126. In a particular illustrative embodiment, the communication tower 126 may be coupled to wireless infrastructure equipment. In other embodiments, the communication equipment may include access points or base stations distributed in geographic locations in relative proximity to the first device 102. Similarly, the network 130 is coupled via second communication infrastructure equipment 128 to the second device 142. The network 130 is coupled to one or more servers 120.

The first device 102 is a communication device such as a smart phone, a cell phone, a laptop, a tablet, or any other electronic device that can be used for communications. The first device 102 includes a processor 103 and a memory 104. The memory 104 includes instructions that are executable by the processor 103 to perform operations, such as displaying a plurality 110 of call alert options at a user interface 109. The user interface 109 may be displayed at a display device 106. The display device 106 may be included as part of the first device 102 or may be a separate device that is usable by the first device 102 to display the user interface 109. The operations further include receiving, via the user interface 109, a selection (e.g., of one or more options of a plurality 110 of call alert options).

In the particular illustrative embodiment shown, the user interface 109 is a caller authentication user interface that is usable by a first user of the first device 102 to preauthorize call alerts based on subject matter or by a calling party device. The content that may be preauthorized may include a list of content items (e.g., a first item 111, a second item 112, and a third item 113). Alternatively or in addition, a category 114 of content may be selected and thereby preauthorized. While only a single category 114 is shown in the user interface 109, it should be understood that multiple categories may be shown in the user interface 109 and that one or more of the multiple categories may be selected by a user of the first device 102. An example of a category may be a genre of audio or a type of video content that may be used as a part of a call alert 105. Categories may also include a restriction level of content. For example, a category may include kid-friendly content or may include types of movies or television programs, such as drama, comedy, sporting events, etc. Another type of category may include news content.

The user interface 109 may also include a selectable item 115 that corresponds to user capture content. For example, a user of another device, such as the second device 142, may generate their own content. The user of the other device may generate and capture (e.g., store) content, such as by using a video recorder, or by using a recording capability of the other device. Alternatively, the user of the other device may capture and store content from a third party source, such as content from the service provider of the network 130 or from another content source (not shown). An example of content from a third party source includes content that is obtainable via a peer-to-peer network or another network, such as a network that is used for social media and that supports file sharing.

The operations performed by the processor 103 further include receiving the selection of one or more of the call alert options. For example, in FIG. 1, the first item 111 and the third item 113 are shown as selected by the box checks. In alternative embodiments, or in other use cases of the specific embodiment shown, a user may select any one or more of the other options from the user interface 109. For example, the category option 114 may be selected, or a particular device may be authorized to send user captured content by selecting the user capture option 115. While only one user capture option is shown, it should be understood that multiple user capture options may be shown, such as by displaying user capture options corresponding to a plurality of different devices.

Once the selected call alert options (e.g., 111, 113) in the user interface 109 have been received, the processor 103 may send information 117 associated with the selected call alert options 111 and 113 to the server 120. For example, the processor 103 may convert data representative of the first item 111 and the second item 113 and may insert such data as information 117 in a message that is sent via the network 130 to the server 120. The information 117 associated with selected call alert items 111 and 113 may be stored in the server 120 for subsequent use. For example, the information 117 may be accessed and presented to another device, such as the second device 142 when the second device 142 attempts to place a call to the first device 102.

During operation of the system 100, a second user of the second device 142 may elect or otherwise decide to place a call to the first device 102. The second user of the second device 142 is presented with a variety of options with respect to selecting a call alert to be associated with a call request 118. For example, the second device 142 may select a particular ringtone to be played when the call is placed to the first device 102. The ringtone may provide an alert of the requested incoming call. As an alternative, the second device 142 may provide visual media content, such as a video clip or graphical information, such as an image, that may be displayed along with playback of audio. In this manner, the second device 142 may have certain control, or restricted control depending on preferences of the first device 102, with respect to what type of call alerts may be generated and played back at the first device 102 in connection with the call request 118 from the second device 142 to the first device 102.

The second device 142 may be used to select a destination device for a call. For example, a second user of the second device 142 may either use a keypad or a touchscreen to dial a specific number or may elect to view a contact list and select a particular contact from the contact list in order to identify a target destination device. For example, the second user of the second device 142 may review her contacts list and identify the first user of the first device 102. The second device 142 may be used to place a call to the first device 102. As part of placing the call, the second device 142 may either use a default call alert or may select a customized personalized call alert. For example, after the second user of the second device 142 uses a user interface 149 to select the first device 102, the user interface 149 may display a plurality 150 of call alert options. The plurality 150 of call alert options may include call alert options 111 and 113 as illustrated. The illustrated call alert options 111 and 113 have been preauthorized by the first device 102 as described previously with respect to the user interface 109 displayed at the first device 102.

Because the call alert items options 111 and 113 have been preauthorized, the second user of the second device 142 may elect either of these options as a call alert in connection with sending a call request to the first device 102. In the user interface 149 shown in FIG. 1, the second user of the second device 142 elects the call alert option 113. Upon electing the call alert option 113 (e.g., by checking the box next to call alert option 113), the processor 142 of the second device 142 generates data 160 that is related to the call alert item 113. The data 160 related to the call alert item 113 is inserted into an appropriate message (e.g., a session initiated protocol (SIP) message 118 within a call request 118). For example, the SIP message included within the call request 118 may include an INVITE command that may be configured to contain the data 160. The call request 118 is then sent from the second device 142 to the destination device (i.e., the first device 102) via the network 130. In a particular illustrative embodiment, the data 160 may include a unique identifier of the call alert 113 (for retrieval of a content item stored at the memory 104 of the first device 102, such as based on an index of call alert identifiers) or the data 160 may include information related to or otherwise identifying the call alert option 113. In alternative embodiments, the data 160 may include content associated with the call alert option. In some cases, the server 120 may utilize the data 160 to identify content to be sent from the server 120 to the first device 102 (e.g., the media content item 153) in conjunction with the call request 118 from the second device 142.

In other embodiments, the content related to the call alert option 113 is pre-stored within the memory 104 of the destination device 102. In either event, the call request 118 that includes the data 160 is communicated via the network 130 to the first device 102. Upon the first device 102 receiving the call request 118, the processor 103 may retrieve the data 160 which identifies the call alert option 113 selected by the user of the second device 142. The processor 103 retrieves content 153 corresponding to the selected call alert option 113 and then plays the retrieved content item 153 at the first device 102. For example, a speaker 122 of the first device 102 may play audio such as a ringtone that corresponds to the content item 153 and/or a display device 106 may display video or a fixed image corresponding to the media content item 153 that is associated with the call alert option 113.

Thus, FIG. 1 illustrates a system 100 configured to allow a second user of a second device 146 (e.g., a caller) to select a media content item to be played at a first device 102 as part of a call alert 105 (e.g., a ringtone). The system 100 allows the second user to personalize the call alert 105 as a way to improve the user experience associated with making a call. However, a first user of the first device 102 may want to limit the media content that may be provided as part of the call alert 105. Using a user interface 109, the first user may identify particular media content items or categories that are authorized to be used as the call alert 105. The system 100 serves as an improvement over previous ringtone selection systems. For example, limiting the call alert 105 to content authorized by the first user will allow for improved privacy or prevent the second user from selecting content that the first user does not enjoy and would not want broadcasted from the first device 102.

In a particular example, the data 160 related to the third call alert option 113 includes a unique identifier of the third call alert option 113 or the processor 103 further retrieves the content 153 from the memory based on the unique identifier. In another example, the data 160 relates to the third call alert option 113 and includes a content item corresponding to the third call alert option 113. The third call alert option 113 corresponds to a third content item 153, and the third content item 153 may comprise audio content, video content, or a combination thereof.

The fourth call alert option 114 corresponds to a first category of content items. In this case, the call alert 105 may include a content item associated with a first content item of a plurality of content items. For example, the category may be a genre, such as country music, and the plurality of content items may include a list of recommended country music items or a pre-designated set of country music songs. Thus, a particular country music song would be within the category of country music.

In the case of user-captured content, the user content generated at the second device 142 may include audio content, visual content, or a combination thereof. The server 120 may be configured to filter the user content captured by the second device 142. For example, to the extent the content generated by the second device 142 includes objectionable content such as profanity or other images not appropriate for certain audiences, filtering within the server 120 may be performed to delete or otherwise modify or redact the unauthorized content. The server 120 may also receive external content from an external server, such as a content delivery network. The server 120 may be configured to filter the external content because the external server may not necessarily be controlled by the server 120.

In an alternative embodiment, the call alert options may be determined based on profile information associated with the first device 102. For example, information associated with the first user of the first device 102 may be used, such as purchased content, viewed content, purchasing patterns, etc. Recommendations for call alert options may be provided based on the information. For example, the server 120 may generate a suggested list of call alert options based on the information by extrapolating data trends in order to identify what the first user would more likely authorize.

A method of operating a communication device is shown. The method includes receiving, at a second device 142, a set of call alert options 144 associated with a first device 102. The method further includes receiving, via the user interface 149, first input selecting a call alert option 113 of a set 152 of call alert options. The method further includes sending a call request 118 from the second device 142 to the first device 102 where the call request 118 includes data 160 related to the call alert option 113. The method further includes storing the data 160 related to the call alert option 113 at a memory 144 of the second device 102. The method further includes, prior to transmitting a second call, retrieving the data 160 from the memory 144 and sending a second call request for the second call from the second device 142 to the first device 102. The second call request includes the data 160 retrieved from the memory 144. Thus, once the data 160 is generated for a first selection for a first call, the data 160 may be stored in the memory 144 of the second device 142 and used in subsequent calls. Storing the data 160 in the memory 144 allows the second device 142 to make subsequent calls without having to select from the set 152 of call alert options, so a call request may be sent faster and with less obstruction.

In a particular exemplary implementation, the processor 103 performs operations that include sending authorization information 117 to the server 120. The server 120 is configured to preauthorize the second device 142 to select content based on the authorization information 117. For example, the authorization information 117 may include information identifying the second device 142 as an approved call alert device. An approved call alert device is permitted to provide content such as user generated content or user selected content from a third party source to be included as part of the call alert 105 corresponding to the call request 118. In a particular example, the call alert 105 may include a photo that was captured by the second device 142 (e.g., a photo of a child associated with the second user). Alternatively, the call alert 105 may include a video that was captured by the second device 142 (e.g., a video recording of a startled cat).

Thus, FIG. 1 illustrates a system 100 configured to allow a second user of a second device 142 (e.g., a caller) to select a media content item to be played at a first device 102 as part of a call alert 105 (e.g., a ringtone). The system 100 allows the second user to personalize the call alert 105 as a way to improve the user experience associated with making a call. However, a first user of the first device 102 may want to limit the media content that may be provided as part of the call alert 105. Using a user interface 109, the first user may identify particular media content items or categories that are authorized to be used as the call alert 105. The system 100 serves as an improvement over previous ringtone selection systems. For example, limiting the call alert 105 to content authorized by the first user will allow for improved privacy or prevent the second user from selecting content that the first user does not enjoy and would not broadcasted from the first device 102.

Figure 2:
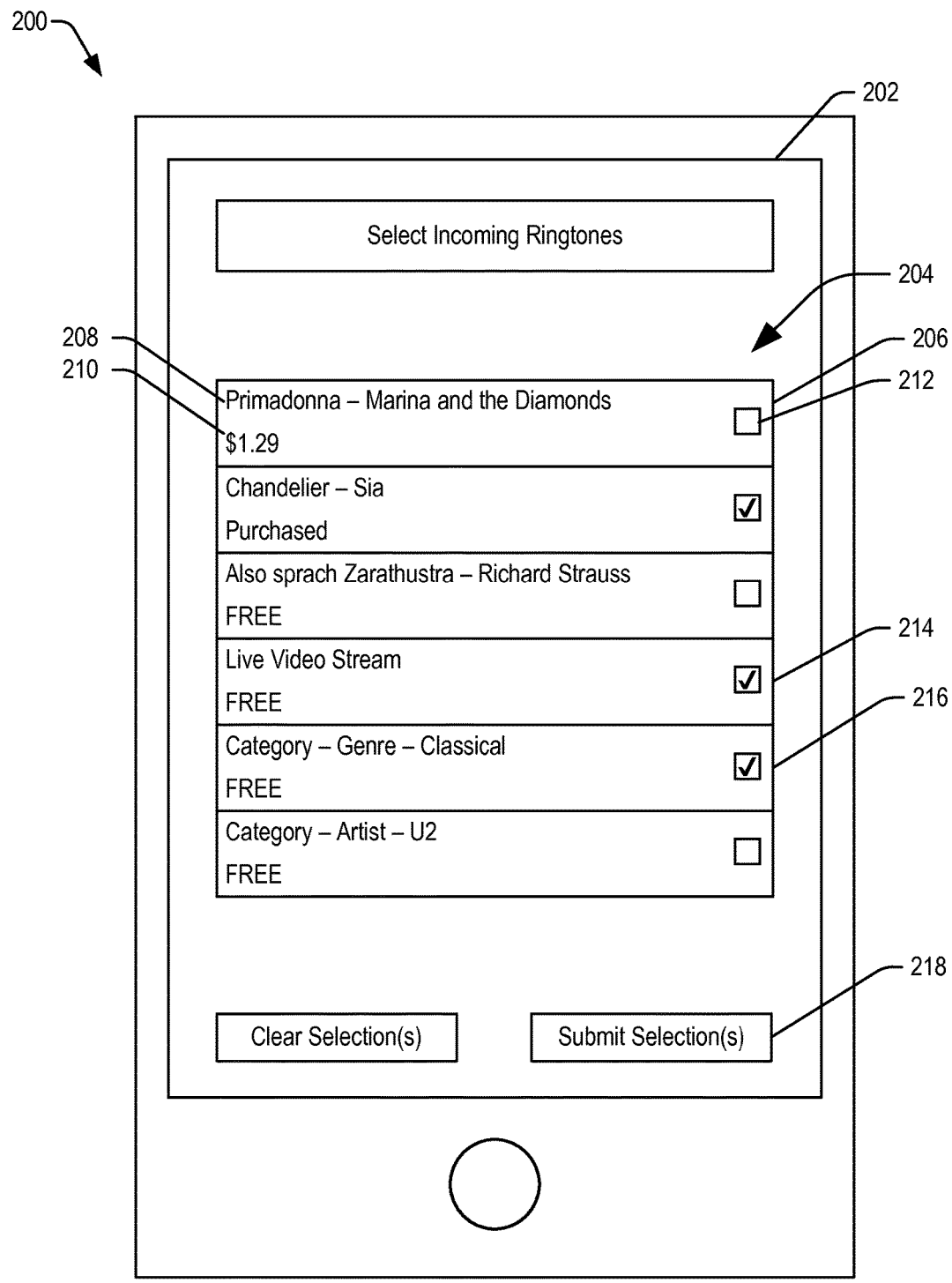
FIG. 2 is a diagram illustrating a particular embodiment of a first device of a system that supports calling party selected call alerts, the first device configured to enable selection of media content items for a list of approved content.

Referring to FIG. 2, an illustrative embodiment of a device is shown and is generally designated 200. The device 200 may correspond to the first device 102 of FIG. 1. A user interface 202 may be displayed at the device 200 via an integrated display device, such as the display device 106 of FIG. 1. The user interface 202 may correspond to the user interface 109 of FIG. 1. The user interface 202 may be used to select media content items from a plurality 204 of call alert options, such as the plurality 110 of call alert options of FIG. 1. The selected media content items may be included in authorization information, such as the authorization information 117 of FIG. 1. The plurality 204 of call alert options may include one or more media content items arranged into one or more selectable entries, such as a first entry 206.

In a particular embodiment, the first entry 206 may include information descriptive of a first media content item. The information may include a content title 208 that may identify a song title and an artist associated with the first media content item. The information may also include fee information 210 associated with selection of the first media content item. In a particular embodiment, the fee information 210 is associated with a fee determined by a billing system associated with the server 120 such that the billing system may approve or decline selection of the first entry 206 based on whether the fee has been paid. In another embodiment, the billing system may approve or decline usage of the first media content item based on whether the fee has been paid. The selection or the fee may be based on a service level agreement (e.g., basic subscription users may be charged a fee for all content, but premium subscription users may have access to some or all content without an additional fee). The first entry 206 may include a selection indicator 212 that identifies whether the first media content item has been selected to be included in the information 117 (e.g., authorized call alert selections). The selection indicator 212 may use a check box, highlighting, shading, or any other graphical user interface elements to indicate whether the first entry 206 has been selected. The plurality 204 of call alert options may include a user-generated content entry 214. The user-generated content entry 214 may be selected when the first user chooses to receive live content from a calling device, such as the second device 142 of FIG. 1. For example, the calling device may be configured to capture video or audio content as the live content, such as a video recording of the caller or an audio recording of the caller's voice. A content category entry 216 may be included in the plurality 204 of call alert options to allow selection of a particular genre, artist, etc. If the content category entry 216 is selected, content matching an associated category may be selectable as the call alert. After receiving one or more selections of media content items, a confirmation box 218 may be selected to cause the device 200 to send the authorization information to the server 120.

Figure 3:
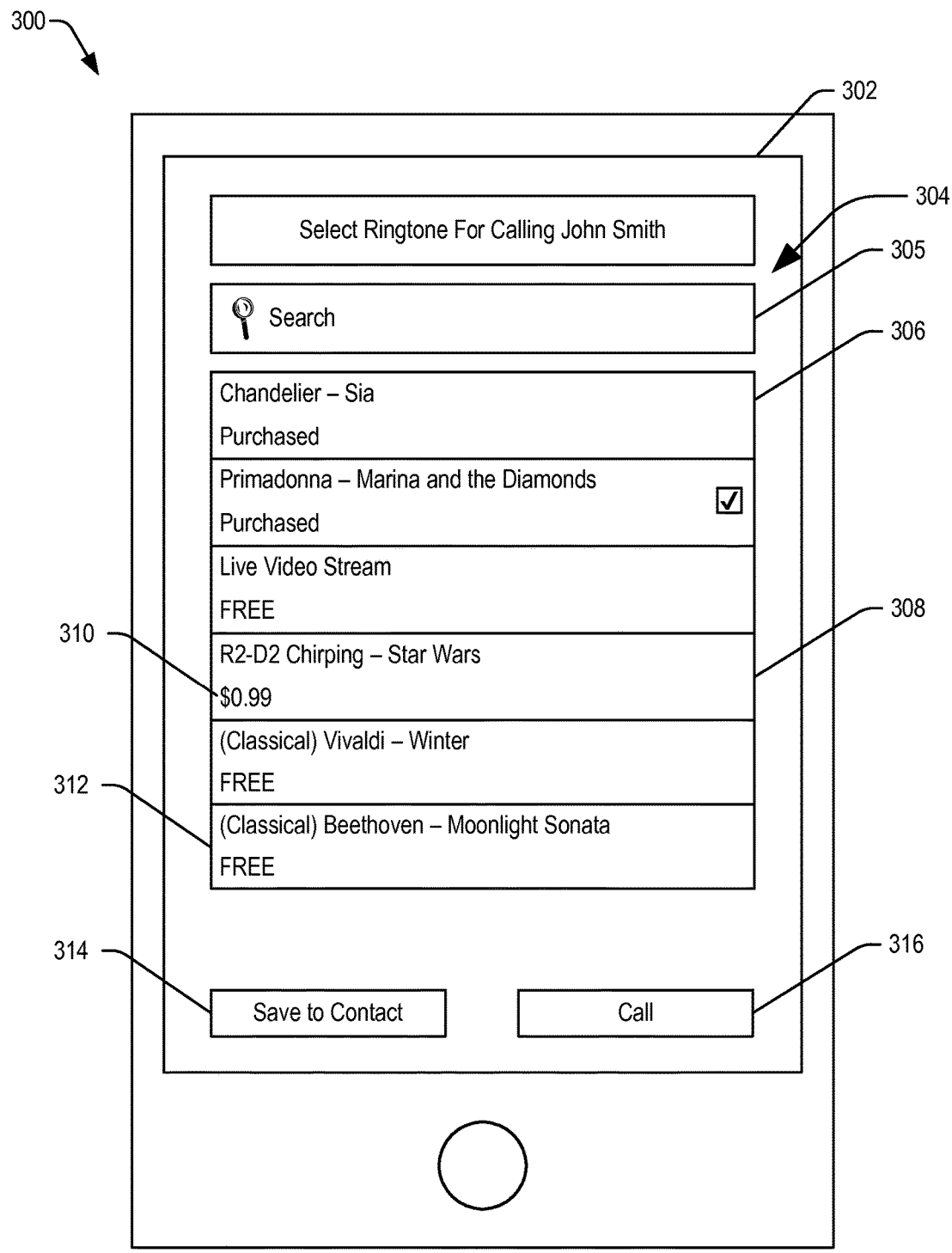
FIG. 3 is a diagram illustrating a particular embodiment of a second device of a system that supports calling party selected call alerts, the second device configured to enable selection of a particular media content item from a list of approved content to be used as a call alert.

Referring to FIG. 3, an illustrative embodiment of a device is shown and is designated 300. The device 300 may correspond to the second device 142 of FIG. 1. A user interface 302 may be displayed at the device 300 via an integrated display device, such as the display device 146 of the second device 142 of FIG. 1. The user interface 302 may be used to select a media content item from a plurality 304 of call alert options. The plurality 304 of call alert options may correspond to the plurality 150 of call alert options of FIG. 1. In a particular embodiment, the plurality 304 of call alert options may identify content that has been approved by the first user of FIG. 1, such as call alert options identified in the authorization information 117. If the plurality 304 of call alert options is unable to be displayed fully on the user interface 302 (e.g., if the plurality 304 of call alert options is too long), a search bar 305 may be used to search the plurality 304 of call alert options based on user input (e.g., search strings).

The user interface 302 may receive a selection of a particular entry 306 of the plurality 304 of call alert options via a tap, a long press, a swipe, a button press, or any other action used to interact with a graphical user interface. The particular entry 306 may be associated with a particular media content item selected by the first user, as described above with respect to FIG. 2. After the user interface 302 receives selection of the particular entry 306, an indication of the selection is sent to the server 120. In a particular embodiment, the indication of the selection may be sent as the data 160 in conjunction with the call request 118 in response to selection of a call button 316. In another embodiment, the indication of the selection may be stored to the memory 144 of the second device 142 in response to selection of a save button 314 such that a subsequent call request may include the indication of the selection without subsequent selection of media content from the plurality 304 of call alert options.

The plurality 304 of call alert options may also include an unpaid content entry 308 associated with an unpaid media content item that is associated with a fee indicated by fee information 310. The unpaid media content item may be a media content item that has not been paid for by a user. In a particular embodiment, the billing system may require that a fee associated with the unpaid media content item be paid by the second user before the unpaid media content item may be used as the call alert 105 at the first device 102 of FIG. 1 or the device 200 of FIG. 2. Alternatively, the billing system may generate or charge a fee to an account associated with the device 200 or the device 300.

The plurality 304 of call alert options may further include a category-based entry 312. The category-based entry 312 may be included in the plurality 304 of call alert options in response to a particular category (e.g., the category 114 illustrated in FIG. 1) being selected for inclusion. For example, with reference to FIG. 2, the category content entry 216 is selected and associated with a classical music genre. Thus, classical music is included in the plurality 304 of call alert options for selection.

In some cases, the plurality 304 of call alert options may be different (e.g., out of sync) with the authorization information 117 stored at the server 120. For example, the second user may select the particular entry 306 prior to receiving an updated version of the plurality 304 of call alert options that indicates that the particular entry 306 is no longer an approved content item. In a particular embodiment, the device 300 may send an indication of the selection to the server 120, and, in response to the indication of the selection, the server 120 determines whether the selection is valid with reference to the plurality 304 of call alert options. In response to a determination that the selection is unusable or invalid, the server 120 may send the updated version of the plurality 304 of call alert options to the device 300. The device 300 may update the plurality 304 of call alert options based on the updated version of plurality 304 of call alert options.

Figure 4:
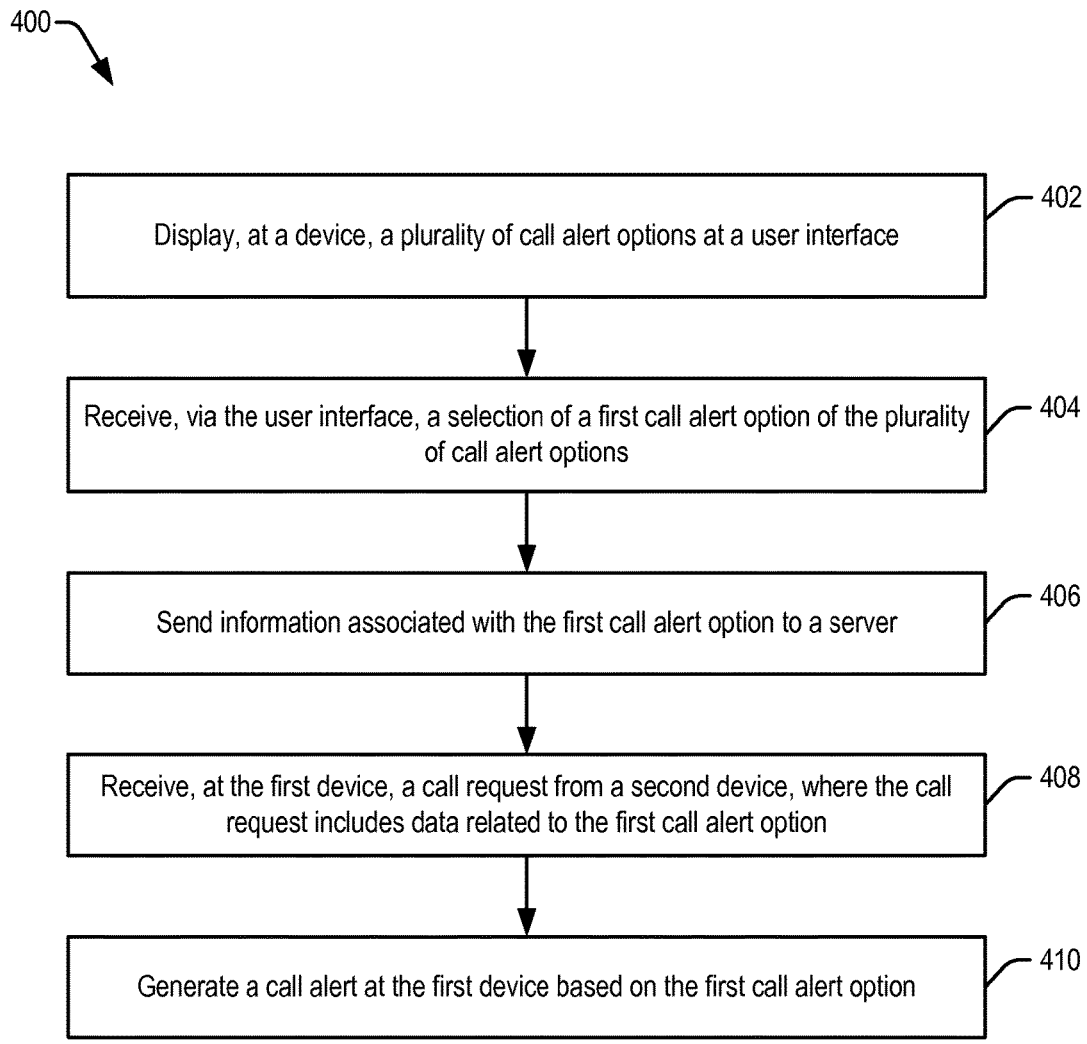
FIG. 4 is a flow diagram that illustrates a particular example of a method of operation of a service provider system, such as the system of FIG. 1.

Referring to FIG. 4, a particular illustrative example of a method is depicted and generally designated 400. The method 400 may be performed at a device or a system, such as the first device 102 of FIG. 1 or the device 200 of FIG. 2.

The method 400 includes displaying, at a first device, a plurality of call alert options at a user interface, at 402. The first device may correspond to the first device 102 of FIG. 1 or the device 200 of FIG. 2. The user interface may correspond to the user interface 109 of FIG. 1 or the user interface 202 of FIG. 2. The method 400 also includes receiving, via the user interface, a selection of a first call alert option of the plurality of call alert options, at 404. The first call alert option may correspond to the first call alert option 111 of FIG. 1. The plurality of call alert options may correspond to the plurality 110 of call alert options of FIG. 1 or the plurality 204 of call alert options of FIG. 2. The method 400 also includes sending information associated with the first call alert option to a server, at 406. The information may correspond to the authorization information 117 of FIG. 1. The server may correspond to the server 120 of FIG. 1. The method 400 further includes receiving, at the first device, a call request from a second device, where the call request includes data related to the first call alert option, at 408. The second device may correspond to the second device 142 of FIG. 1 or the device 300 of FIG. 3. The method 400 further includes generating a call alert at the first device based on the first call alert option, at 410. For example, referring to FIG. 1, the call alert 105 may be generated at the first device 102.

Thus, the method 400 enables a device (e.g., the first device 102 of FIG. 1 or the device 200 of FIG. 2, corresponding to a device of a party to be called) to generate authorization information that is associated with call alert options and generating the call alert based on a selection of a particular media content item by the second device 142 or the device 300.

Figure 5:
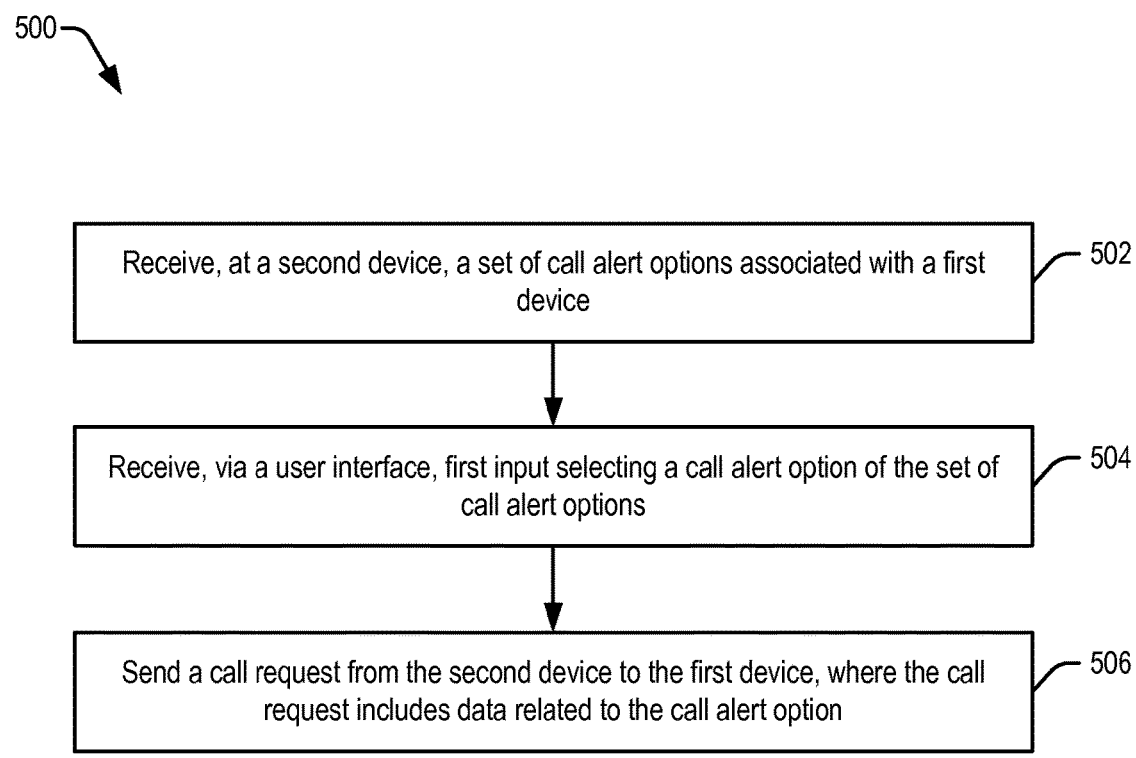
FIG. 5 is a flow diagram that illustrates a particular example of a method of operation of an electronic device, such as a first device illustrated in the system of FIG. 1.

Referring to FIG. 5, a particular illustrative example of a method is depicted and generally designated 500. The method 500 may be performed at a device, such as the second device 142 of FIG. 1 or the device 300 of FIG. 3.

The method 500 includes receiving, at a second device, a set of call alert options associated with a first device, at 502. The first device may correspond to the first device 102 of FIG. 1 or the device 200 of FIG. 2. The second device may correspond to the second device 142 of FIG. 1 or the device 300 of FIG. 3. The method 500 also includes receiving, via a user interface, first input selecting a call alert option of the set of call alert options, at 504. The method 500 also includes sending a call request from the second device to the first device, where the call request includes data related to the call alert option, at 506. Thus, the method 500 enables a second device (e.g., the second device 142 of FIG. 1 or the device 300 of FIG. 3, corresponding to a device of a calling party) to select a particular content item from a plurality of call alert options to be used as part of a call request sent to the first device 102 or the device 200.

Figure 6:
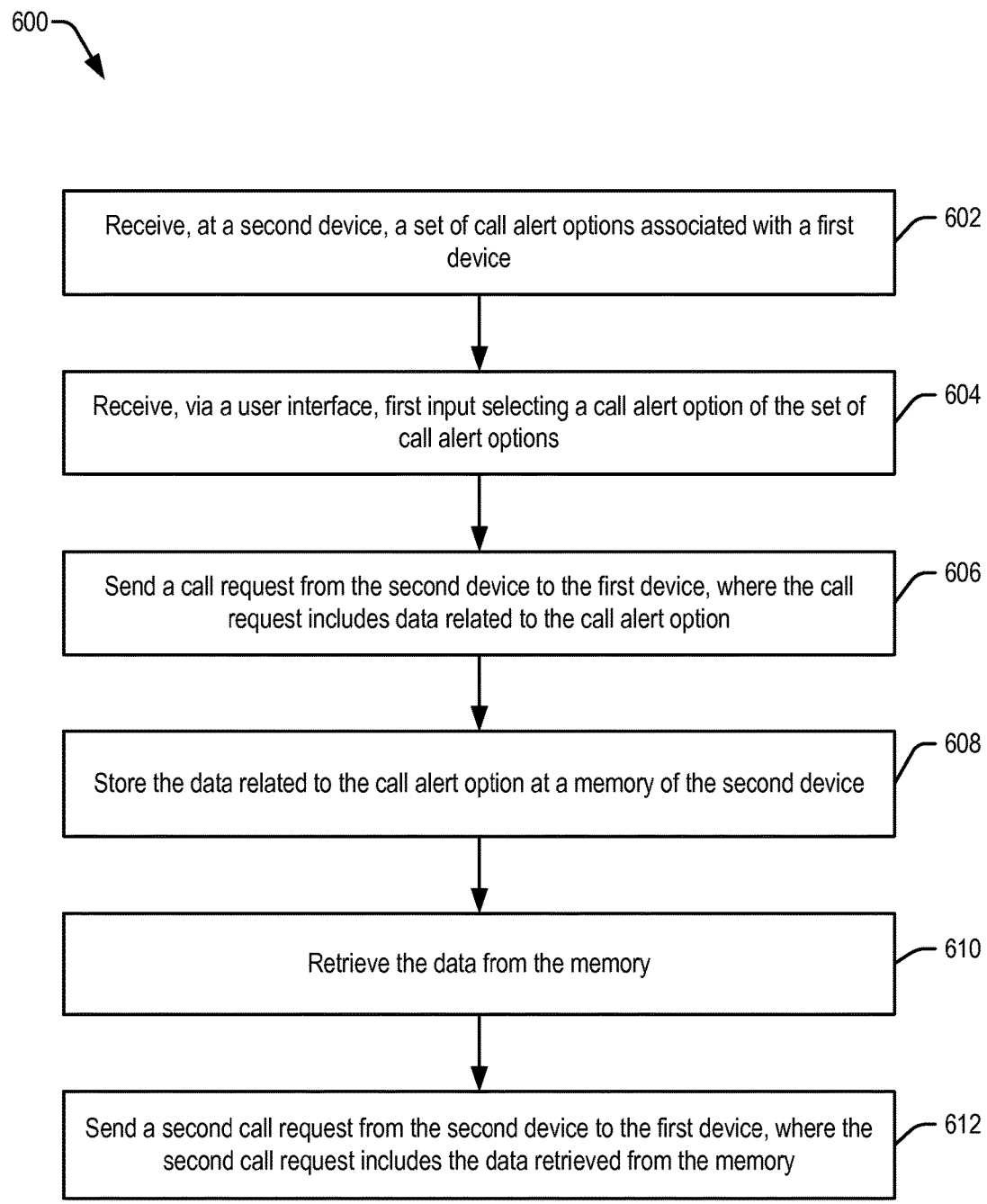
FIG. 6 is a flow diagram that illustrates a particular example of a method of operation of an electronic device, such as a second device illustrated in the system of FIG. 1.

Referring to FIG. 6, a particular illustrative example of a method is depicted and generally designated 600. The method 600 may be performed at a device, such as the second device 142 of FIG. 1 or the device 300 of FIG. 3.

The method 600 includes receiving, at a second device, a set of call alert options associated with a first device, at 502. The first device may correspond to the first device 102 of FIG. 1 or the device 200 of FIG. 2. The second device may correspond to the second device 142 of FIG. 1 or the device 300 of FIG. 3. The method 600 also includes receiving, via a user interface, first input selecting a call alert option of the set of call alert options, at 604. The method 500 also includes sending a call request from the second device to the first device, wherein the call request includes data related to the call alert option, at 606.

In the particular embodiment illustrated in FIG. 6, the method 600 further includes storing the data related to the call alert option at a memory of the second device, at 608. In FIG. 6, the method 600 also includes retrieving the data from the memory, at 610. The method 600 further includes sending a second call request from the second device to the first device, where the second call request includes the data retrieved from the memory, at 612.

Thus, the method 600 enables the second device 142 or the device 300 to select a particular content item from a plurality of call alert options to be used as part of a call request sent to the first device 102 or the device 200.

Figure 7:
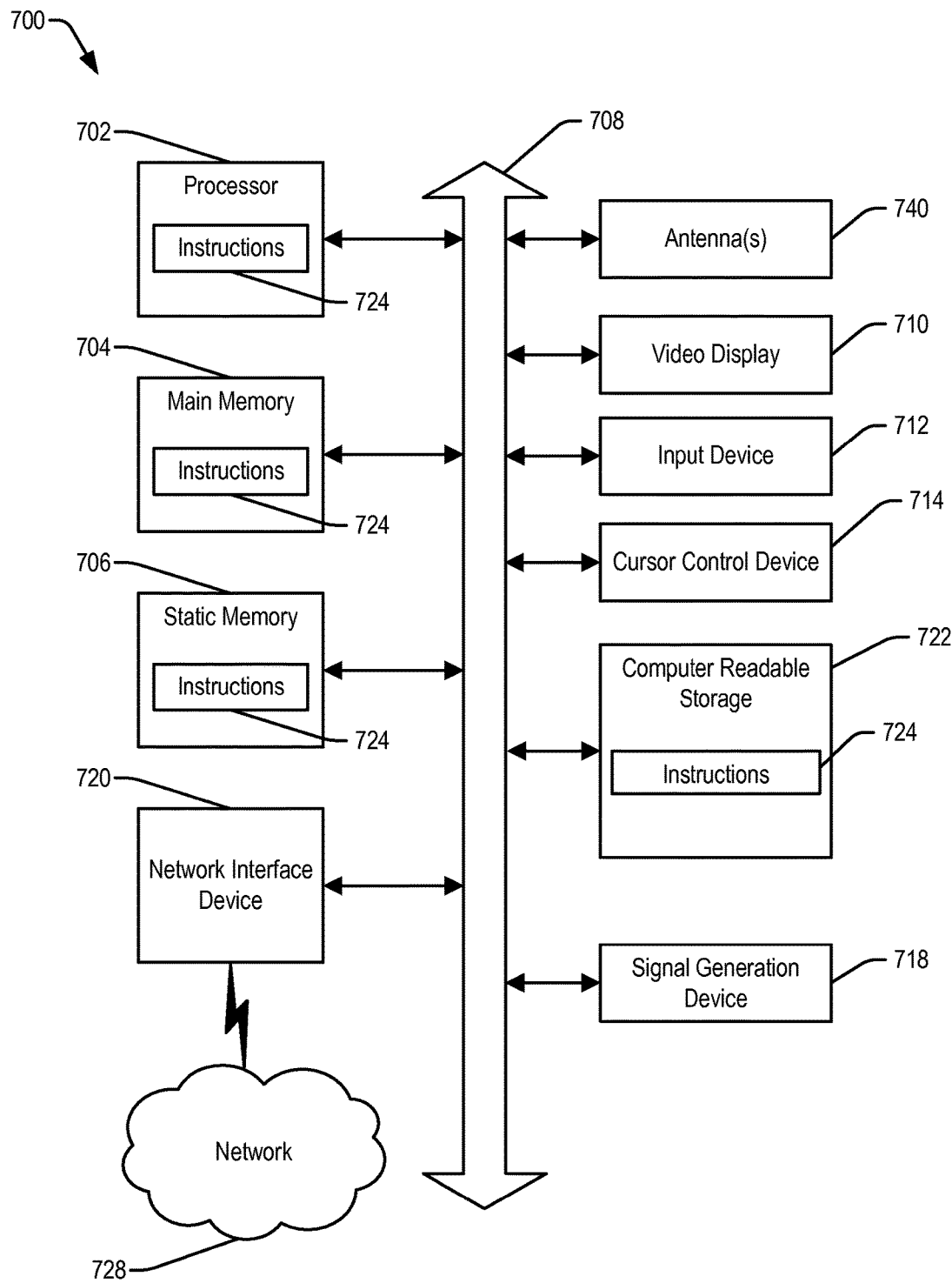
FIG. 7 is a block diagram of an illustrative embodiment of a general computer system that supports calling party selected call alerts.

Referring to FIG. 7, an illustrative embodiment of a general computer system is shown and is designated 700. The computer system 700 includes a set of instructions that can be executed to cause the computer system 700 to perform any one or more of the methods or computer based functions disclosed herein. The computer system 700 may operate as a standalone device or may be connected, e.g., using a network, to other computer systems or peripheral devices. For example, one or more components of the computer system 700 may include or be included within any one or more of the first device 102, the second device 142, the server 120 of FIG. 1, the device 200 of FIG. 2, the device 300 of FIG. 3, or a combination thereof.

In a networked deployment, the computer system 700 may operate in the capacity of a server or as a client user computer in a server-client user network environment, or as a peer computer system in a peer-to-peer (or distributed) network environment. For example, the server may include the server 120 of FIG. 1. The client user computer may include the first device 102, the second device 142, the device 200, the device 300, or a combination thereof The computer system 700 may also be implemented as or incorporated into various devices, such as a mobile device, a palmtop computer, a laptop computer, a desktop computer, a communications device, a wireless telephone, a personal computer (PC), a tablet PC, a personal digital assistant (PDA), an endpoint device, a web appliance, or any other machine capable of executing a set of instructions (sequential or otherwise) that specify actions to be taken by that machine. In a particular embodiment, the computer system 700 may be implemented using electronic devices that provide video, audio, or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. For example, when the computer system 700 corresponds to a media device, the processor 702 may include or correspond to the processor 103 of the first device 102 or the processor 143 of the second device 142. As another example, when the computer system 700 corresponds to a network device (e.g., a server), the processor 702 may include or correspond to processor(s) of the server 120. Moreover, the computer system 700 may include a main memory 704 and a static memory 706, which can communicate with each other via a bus 708. For example, when the computer system 700 corresponds to a media device, the main memory 704 may include or correspond to the memory 104 of the first device 102 or the memory 144 of the second device 142. As another example, when the computer system 700 corresponds to a server, the main memory 704 may include or correspond to a memory of the server 120.

As shown, the computer system 700 may further include a video display unit 710, such as a liquid crystal display (LCD), a light emitting diode (LED) display, a touch screen display, a flat panel display, or a solid state display. Additionally, the computer system 700 may include an input device 712, such as a remote control device or a keyboard, and a cursor control device 714, such as a mouse. In some embodiments, the input device 712 and the cursor control device 714 may be integrated into a single device, such as a capacitive touch screen input device. The computer system 700 may also include a signal generation device 718, such as a speaker, and a network interface device 720. Some computer systems 700 may not include certain components depicted in FIG. 7, such as an input device (e.g., a server may not include an input device). To illustrate, when the computer system 700 corresponds to the server 120, the computer system 700 may not include an input device.

The computer system 700 may correspond to a mobile device that includes one or more antennae, such as an antenna 740. In other cases, the computer system 700 may be a wired device (e.g., a server) that does not include an antenna.

In a particular embodiment, as depicted in FIG. 7, the computer system 700 may include computer-readable storage 722 in which one or more sets of instructions 724, e.g. software, can be embedded. The computer-readable storage 722 may be random access memory (RAM), read-only memory (ROM), programmable read-only memory (PROM), erasable PROM (EPROM), electrically erasable PROM (EEPROM), register(s), solid-state memory, hard disk, a removable disk, a compact disc read-only memory (CD-ROM), other optical disk storage, magnetic disk storage, magnetic storage devices, or any other storage device that can be used to store program code in the form of instructions or data and that can be accessed by a computer and/or a processor. Computer-readable storage is not a signal. Further, the instructions 724 may embody one or more of the methods or logic as described herein.

In a particular embodiment, when the computer system 700 corresponds to a network device, FIG. 7 illustrates that the instructions 724 may be executable by the processor 702 to perform one or more functions or methods described herein, such as operations associated with the method 400 of FIG. 4. In an alternative embodiment, components of the computer system 700 are integrated within the first device 102 of FIG. 1 or the device 200 of FIG. 2, and the instructions 724 are executable by the processor 702 to perform operations described with reference to the first device 102 of FIG. 1 or the device 200 of FIG. 2 and/or the method 500 of FIG. 5. In another alternative embodiment, components of the computer system 700 are integrated within the second device 142 of FIG. 1 or the device 300 of FIG. 3, and the instructions 724 are executable by the processor 702 to perform operations described with reference to the second device 142 of FIG. 1 or the device 300 of FIG. 3 or the method 600 of FIG. 6.

In a particular embodiment, the instructions 724 may reside completely, or at least partially, within the main memory 704, the static memory 706, and/or within the processor 702 during execution by the computer system 700. The main memory 704 and the processor 702 also may include a computer-readable storage device.

In an alternative embodiment, dedicated hardware implementations, such as application specific integrated circuits, programmable logic arrays and other hardware devices, may be constructed to implement one or more of the methods described herein. Various embodiments may include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an exemplary, non-limiting embodiment, implementations may include distributed processing, component/object distributed processing, and parallel processing. Alternatively, virtual computer system processing may be constructed to implement one or more of the methods or functionality as described herein. It is further noted that a computing device, such as a processor, a controller, a state machine or other suitable device for executing instructions to perform operations may perform such operations directly or indirectly by way of one or more intermediate devices directed by the computing device.

The present disclosure includes computer-readable storage 722 that stores instructions 724, so that a device connected to a network 728 (e.g., the network 130) may communicate voice, video or data over the network 728. While the computer-readable storage 722 is shown to be a single device, the computer-readable storage 722 may include a single device or multiple devices, such as a centralized or distributed database, and/or associated caches and servers that store one or more sets of instructions. The computer-readable storage 722 is capable of storing a set of instructions for execution by a processor to cause a computer system to perform any one or more of the methods or operations disclosed herein. For example, the computer-readable storage 722 may store instructions for execution by a processor to cause a computer system to perform one or more of the operations 400 of FIG. 4, one or more operations of the method 500 of FIG. 5, or one or more operations of the method 600 of FIG. 6.

In a particular non-limiting, exemplary embodiment, the computer-readable storage 722 may include a solid-state memory such as embedded memory (or a memory card or other package that houses one or more non-volatile read-only memories). Further, the computer-readable storage 722 may be a random access memory or other volatile re-writable memory. Additionally, the computer-readable storage 722 may include a magneto-optical or optical device, such as a disk or tapes or other storage device. Accordingly, the disclosure is considered to include any one or more of a computer-readable storage device and other equivalents and successor devices, in which data or instructions may be stored.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for device detection, short-range communications, and long-range communications can be used by the computer system 700 in selected embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order unless expressly stated. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines (e.g., virtual servers), components such as microprocessors and storage devices may be virtualized or logically represented. The processor can include a state machine, an application specific integrated circuit, and/or a programmable gate array (PGA) including a FPGA. In one or more embodiments, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A device comprising:
   a processor; and
   a memory comprising instructions that, when executed by the processor, cause the processor to perform operations comprising:
   displaying a plurality of call alert options at a user interface;
   receiving, via the user interface, a selection of a first call alert option of the plurality of call alert options;
   sending information associated with the first call alert option to a server;
   receiving a call request from a second device, wherein the call request includes data related to the first call alert option, and wherein the data related to the first call alert option includes an identifier of the first call alert option;
   retrieving a content item from the memory based on the identifier; and
   responsive to receiving the call request, generating a call alert based on the content item.

2. The device of claim 1, wherein the operations further include receiving authorization information, the authorization information corresponding to call alert subject matter authorization information, calling device authorization information, or a combination thereof.

3. The device of claim 2, wherein the operations further include sending the authorization information to the server, wherein the server is configured to pre-authorize the second device to select content based on the authorization information.

4. The device of claim 1, wherein the operations further comprise, prior to receiving the call request, identifying the second device as an approved device, wherein the approved device is permitted to provide content to be included as part of the call alert.

5. The device of claim 1, wherein the data includes visual media data.

6. The device of claim 5, wherein the call alert is further based on the visual media data.

7. The device of claim 1, wherein the first call alert option corresponds to a first content item, and wherein the first content item comprises audio content, video content, or a combination thereof.

8. The device of claim 1, wherein the first call alert option corresponds to a first category of content items, and wherein the content item is associated with the first category of content items.

9. The device of claim 8, wherein the first category of content items is associated with a first plurality of content items, and wherein the first plurality of content items includes the content item.

10. The device of claim 8, wherein the first category of content items is associated with user content captured by the second device, and wherein the user content includes audio content, video content, or a combination thereof.

11. The device of claim 10, wherein the server is configured to filter the user content captured by the second device.

12. The device of claim 8, wherein the first category of content items is associated with media content accessible to the server.

13. The device of claim 12, wherein the media content includes video content, audio content, or social media content.

14. The device of claim 8, wherein the server is configured to determine a first plurality of content items associated with the first category of content items, the first plurality of content items to be displayed via the user interface.

15. The device of claim 1, wherein the server is configured to determine the plurality of call alert options based on device usage information.

16. A method comprising:
   displaying, at a first device, a plurality of call alert options at a user interface;

receiving, via the user interface, a selection of a first call alert option of the plurality of call alert options;

sending information associated with the first call alert option to a server;

receiving, at the first device, a call request from a second device, wherein the call request includes data related to the first call alert option, and wherein the data related to the first call alert option includes an identifier of the first call alert option;

retrieving a content item from a memory associated with the first device based on the identifier; and generating a call alert at the first device based on the content item.

17. The method of claim 16, wherein the call request comprises a session initiation protocol request, and wherein the call request is received from the second device via a wireless communications network.

18. A computer-readable storage device storing instructions that, when executed by a processor, cause the processor to perform operations comprising:

displaying a plurality of call alert options at a user interface;

receiving, via the user interface, a selection of a first call alert option of the plurality of call alert options;

sending information associated with the first call alert option to a server;

receiving a call request from a second device, wherein the call request includes data related to the first call alert option, and wherein the data related to the first call alert option includes an identifier of the first call alert option;

retrieving a content item based on the identifier; and responsive to receiving the call request, generating a call alert based on the content item.

19. The computer-readable storage device of claim 18, wherein the operations further include receiving authorization information, the authorization information corresponding to call alert subject matter authorization information, calling device authorization information, or a combination thereof.

20. The computer-readable storage device of claim 19, wherein the operations further include sending the authorization information to the server, the server configured to pre-authorize the second device to select content based on the authorization information.

* * * * *